United States Patent [19]
Oie et al.

[11] Patent Number: 5,741,599
[45] Date of Patent: Apr. 21, 1998

[54] POLYIMIDE COMPOSITIONS FOR ELECTRODEPOSITION AND COATINGS FORMED OF THE SAME

[75] Inventors: Yoshihiro Oie, Tokyo; Hiroshi Itatani, Chiba-ken; Shinichi Furusaki, Kanagawa-ken; Yuji Yamazaki, Tochigi-ken; Sadakazu Hokamura, Kanagawa-ken, all of Japan

[73] Assignee: PI Materials Research Laboratory, Kanagawa-ken, Japan

[21] Appl. No.: 728,477

[22] Filed: Oct. 10, 1996

[30] Foreign Application Priority Data

Oct. 12, 1995 [JP] Japan ................................. 7-264353

[51] Int. Cl.$^6$ ................ B32B 15/08; C08G 73/10; C09D 179/08
[52] U.S. Cl. .................... 428/458; 204/489; 204/492; 204/493; 204/507; 428/473.5; 524/379; 524/385; 524/389; 524/599; 524/600; 524/901; 528/184; 528/310; 528/350
[58] Field of Search ................... 204/489, 492, 204/493, 507; 428/458, 473.5; 524/379, 385, 389, 599, 600, 901; 528/184, 310, 350

[56] References Cited

U.S. PATENT DOCUMENTS

| | | | |
|---|---|---|---|
| 3,855,169 | 12/1974 | Lupinski et al. | 524/104 |
| 3,892,647 | 7/1975 | Peterson | 204/493 |
| 4,257,861 | 3/1981 | Lupinski et al. | 204/507 |
| 5,502,143 | 3/1996 | Oie et al. | 528/12 |

FOREIGN PATENT DOCUMENTS

| | | |
|---|---|---|
| 0 604 319 A1 | 6/1994 | European Pat. Off. . |
| 2 292 749 | 6/1976 | France . |
| 52-32943 | 3/1977 | Japan . |
| 63-111199 | 5/1988 | Japan . |
| 1 354 532 | 5/1974 | United Kingdom . |
| 2 113 233 | 8/1983 | United Kingdom . |

OTHER PUBLICATIONS

Alvino et. al. "Electrophoretic Deposition of Polymers. II. Polyimides: A Coulombic Study", Journal of Applied Polymer Science, vol. 28, 267–282 (1983).

*Primary Examiner*—D. S. Nakarani
*Attorney, Agent, or Firm*—Armstrong, Westerman, Hattori, McLeland & Naughton

[57] ABSTRACT

Aromatic diamines having a carboxylic acid group and various other diamines are reacted with aromatic tetracarboxylic dianhdyrides in organic polar solvents to provide polyimides. Polyimide compositions for electrodeposition which comprise the neutralized salts of the polyimides, water and poor solvents for the polyimides have good keeping quality and when electrodeposited on electrically conductive materials, can form polyimide coats that have high levels of appearance, smoothness and denseness while exhibiting good physical and chemical characteristics in such aspects as heat resistance, electrical insulation and chemical resistance.

7 Claims, No Drawings

POLYIMIDE COMPOSITIONS FOR ELECTRODEPOSITION AND COATINGS FORMED OF THE SAME

BACKGROUND OF THE INVENTION

This invention relates to polyimide compositions for electrodeposition that have improved heat-resisting, electrical insulating and weathering properties and which are useful in the formation of coatings on electric or electronic parts, vehicular parts, construction materials and machines.

Polyimide resins have good heat resisting, electrical insulating, weathering and chemical resisting properties, as well as superior mechanical characteristics; hence, they are used in a wide range ranging from aerospace and aviation materials to electric and electronic parts. Such polyimide resins are commonly manufactured by processing a precursor polyamic acid, and then heating and dehydrating it for conversion to the polyimide.

Metal products can be coated by various methods including air spraying, roll coating, brush coating and dip coating; however, complex shape metal products cannot be easily provided with uniform coatings by these methods.

The electrodeposition process can effectively solve this problem and it has the additional advantage of small loss in coating materials, which is a definite merit in the prevention of environmental pollution. Hence, there is a need to establish an efficient technique for applying polyimide coatings by electrodeposition.

Conventional known methods for applying polyimide coatings by the electrodeposition process comprise dissolving polyamic acid (i.e., polyimide precursor) in an organic polar solvent, adding a poor solvent and water to prepare an electrodeposition bath as an aqueous dispersion, performing electrodeposition in the bath and heating the deposited film at 240°–260° C. so that it is converted to an imide film (Japanese Patent Public Disclosure Nos. 52252/1974, 32943/1977 and 111199/1988). The polyamic acid containing aqueous dispersion for electrodeposition does not have good keeping quality because the polyamic acid will readily decompose. In addition, the deposited film has to be subjected to a high-temperature treatment for imidation. To deal with these problems, it has been desired to develop a method of electrodeposition from imide compounds.

With recent advances in the performance of electronic materials, the demand for polyimide-based flexible printed wiring boards is growing. Conventionally, polyimide-based printed wiring boards are manufactured by thermally bonding a copper sheet to a polyimide film with the aid of an epoxy- or polyimide-based adhesive. In this connection, the development of new adhesives and the improvement of bonding methods are required. A method that has been proposed to date is to process the polyimide film surface such that metallic copper is precipitated on the film surface by electrolysis. However, it is also known that electrolytic copper has poor bending and mechanical strength properties than rolled copper. It is therefore desired to establish a technique by which polyimide films can be directly formed on a rolled copper sheet by electrodeposition.

SUMMARY OF THE INVENTION

The present invention has been accomplished under these circumstances and has as its object providing a polyimide composition for electrodeposition that has good keeping quality and which is capable of forming polyimide coatings that have high levels of appearance, smoothness and denseness while exhibiting good physical and chemical characteristics in such aspects as heat resistance, electrical insulation and chemical resistance.

Another object of the invention is to provide coatings that are formed by electrodeposition of said polyimide composition.

To achieve the stated object, the electrodeposition bath for use in the invention contains not the polyimide precursor but the polyimide itself and this eliminates the need to heat the electrodeposited coating at high temperature. The present inventors found that by introducing carboxylic acid groups into the polyimide, a polyimide for electrodeposition having increased affinity for water can be prepared and it has also been found that when neutralized, said polyimide will migrate under electrophoresis. The present invention has been accomplished on the basis of these findings. The method is capable of forming the coating of an electrically conductive material and accordingly a flexible copper-polyimide board can be easily manufactured by an unconventional new approach.

DETAILED DESCRIPTION OF THE INVENTION

The present invention will now be described in detail. To prepare the polyimide, substantially equal amounts of an aromatic tetracarboxylic dianhydride and an aromatic diamine are subjected to polycondensation in an organic polar solvent under heating. In the presence of an optionally added catalyst, heating is effected at 140°–200° C. and the resulting water is removed by azeotropic distillation. In order to assure strong adhesion and increased solubility in water, molecular weight control may optionally be performed by adjusting the stoichiometry of the acid dianhydride and diamine or adding a terminator such as maleic anhydride.

While there are no particular limitations on the aromatic tetracarboxylic dianhydride that can be used, the following compounds may be mentioned as typical examples: pyromellitic dianhydride, 3,4,3',4'-benzophenonetetracarboxylic dianhydride, 3,4,3',4'-diphenyltetracarboxylic dianhydride, bis-(3,4-dicarboxyphenyl)ether dianhydride and 2,2-bis-(3, 4-dicarboxyphenyl)hexafluoropropane dianhydride.

An aromatic diaminocarboxylic acid must at least be used as the aromatic diamine in the preparation of the polyimide. Exemplary aromatic diaminocarboxylic acids include 3,5-diaminobenzoic acid, 2,4-diaminophenylacetic acid, 2,5-diaminoterephthalic acid, 3,5-diaminoparatoluylic acid, 3,5-diamino-2-naphthalenecarboxylic acid and 1,4-diamino-2-naphthalenecarboxylic acid, among which 1,3-diaminobenzoic acid is particularly preferred.

The aromatic diamine may be used with another diamine such as 2,6-diaminopyridine. A polyimide containing 3,5-diaminobenzoic acid and 2,6-diaminopyridine has both an acid and a base group in the molecule. Polyimides having such a structure interact to form a satisfactory film. As a further advantage, the polyimide has increased affinity for water and forms a stable water-based electrodeposition bath, which can produce a smooth and dense electrodeposited film.

Other aromatic diamines may be used in combination with the aromatic diaminocarboxylic acid in order to ensure the preparation of a polyimide having the desired adhesion, stiffness, heat resistance and mechanical strength. While there are no particular limitations on the aromatic diamines that are added for these purposes, the following may be mentioned as typical examples: 1,2-, 1,3-, 1,4- phenylenediamine, 2,4-diaminotoluene, 2,5-diaminotoluene, 2,4-diaminoxylene, diaminodurene, 1,5-diaminonaphthalene, 2,6-diaminonaphthalene, benzidine, 4,4'-diaminoterphenyl, 4,4'-diaminoquaterphenyl, 4,4'-diaminodiphenylmethane, 1,2-bis(anilino)ethane, 4,4'-diaminodiphenylether, diaminodiphenylsulfone, 2,2-bis(4-aminophenyl)propane, 2,6-diaminonaphthalene, 3,3'-dimethylbenzidine, 3,3'-dimethyl-4,4'-diaminodiphenylether, 3,3'-dimethyl-4,4'-diaminodiphenylmethane, diaminotoluene, 1,4-bis(4aminophenox)benzene, 4,4'-bis(4-aminophenoxy)biphenyl, 2,2-bis[4-(4-aminophenoxy)phenyl]propane, 4,4'-bis(3-aminophenoxy)diphenylsulfone and 2,2-bis[4-(4-aminophenoxy)phenyl]hexafluoropropane.

Substantially equal amounts of the aromatic acid dianhydride and aromatic diamine described above are heated in an organic polar solvent and dehydrated to prepare a polyimide soluble in an organic polar solvent. Exemplary organic polar solvents include N-methylpyrrolidone, N,N'-dimethylacetamide, N,N'-dimethylformamide, dimethyl sulfoxide, tetramethylurea, tetrahydrothiophen-1,1-oxide, etc. Preferably, less toxic N-methylpyrrolidone and tetrahydrothiophen-1,1-oxide (also known as sulfolane) are used.

The water formed by imidation is removed by azeotropic distillation of toluene, xylene, tetrahydronaphthalene, etc. The catalyst, if it used at all, may be an acid or a base.

To prepare a multi-component polyimide, several kinds of acid dianhydrides and diamines may be mixed simultaneously and subjected to a condensation reaction for yielding a random copolymer. The random polymer has the disadvantage that its characteristics are not averaged but affected by the inferior characteristics. Therefore, a block copolymer is preferred over the random copolymer for achieving performance improvements. The block copolymer is produced by a consecutive reaction, in which an imide oligomer is prepared from the aromatic tetracarboxylic dianhydride and the aromatic diamine in the presence of a binary catalyst consisting of valerolactone and pyridine at the first stage and then additional amount of the aromatic tetracarboxylic dianhydride and/or the aromatic diamine are supplied to the imide oligomer at the second stage so that polycondensation is effected to yield the desired block polyimide (U.S. Pat. No. 5,502,143).

The polyimide composition for electrodeposition which has carboxylic acid groups is dissolved in a polar solvent and neutralized with a basic compound and a poor solvent for the polyimide, as well as water are added to prepare an electrodeposition bath. While there are several poor solvents for the polyimide, benzyl alcohol, substituted benzyl alcohols and furfuryl alcohol are particularly suitable for use in the formation of a smooth-surfaced and dense polyimide film electrodeposition.

While N-dimethyl ethanol, triethylamine, triethanolamine, N-dimethylbenzylamine, and N-methylmorpholine may be used as the neutralizing agent, N-dimethyl methanol and N-methylmorpholine are suitable.

The neutralizing agent is used in such an amount that the polyimide will dissolve or form a stable dispersion in the system consisting of water and the polar solvent. Typically, the neutralizing agent is used in an amount exceeding the theoretical quantity required for neutralization by at least 30 mol %.

The electrodeposition bath containing the composition for electrodeposition is adjusted such that the solids content of the polyimide is 5–15 wt %.

The heretofore known electrodeposition process may be applied without any modification. Stated more specifically, an electrically conductive article to be coated (i.e., workpiece) is immersed in the polyimide electrodeposition bath of the invention at a temperature of 15°–35° C. and a voltage of 20–400 volts, preferably 20–200 volts, is applied to impress an electric current for a period of 30 seconds to 10 minutes, preferably 1–5 minutes, thereby forming an electrodeposited film on the surface of the workpiece. The deposited film is then washed with water, dried with air and stoved by heating at 140°–200° C. for 30 minutes to 1 hour. Water as a washing medium may be replaced by methanol, ethanol, dioxane, ethyl acetate or mixtures thereof.

It is the polyimide that is electrodeposited in a film form in the invention, so the stoving need be performed at a temperature that is sufficient to evaporate the solvent and water and if infrared radiation is to be used as a heating medium, the necessary stoving may be accomplished by heating at 120°–150° C. for 30 minutes to 1 hour. The conventionally electrodeposited polyimide film has to be dried by heating at 240°–260° C. in order to be tightly adherent.

Examples of the electrically conductive workpiece are metal materials such as iron, steels, aluminum, copper and stainless steel. These workpieces may be plated with metals or anodized before electrodeposition of the polyimide. There are no particular limitations on the metals that can be used as electrically conductive workpieces. Workpieces that are particularly useful in the invention are copper foils or sheets, with which one can prepare copper-polyimide substrates for the fabrication of flexible printed wiring boards. Compared with the conventional method in which a copper foil and a polyimide film are thermally bonded with an interposed adhesive, the present invention ensures that polyimide substrates of diverse compositions can be prepared at a lower cost.

The following examples are provided for the purpose of further illustrating the present invention. In the examples, all "parts" and "percentages" are based on weight.

EXAMPLE 1

Preparation of Block Polyimide

A glass-made, separable three-necked flask was used as equipped with a stirrer, a nitrogen introducing tube and a water receptacle having a stop cock at the bottom of a cooling tube. With nitrogen introducing in under stirring, the reactor was submerged in silicone oil, which was heated to carry out the reaction. The reaction temperature is represented by the temperature of the silicone oil.

The reactor was charged with 3,4,3',4'-benzophenonetetracarboxylic dianhydride (64.44 g, 0.2 moles), bis[4-(3-aminophenoxy)phenyl]sulfone (42.72 g, 0.1 mole), valerolactone (3 g, 0.03 moles), pyridine (4.8 g, 0.006 moles), NMP (abbreviation for N-methylpyrrolidone) (400 g) and toluene (90 g), which were stirred at room temperature for 30 min, then heated to 180° C. and stirred at 200 r.p.m. for 1 hour to carry out the reaction. After the reaction, the toluene-water co-distillate (30 ml) was removed. Under cooling with air, 3,4,3',4'-benzophenonetetracarboxylic dianhydride (32.22 g, 0.1 mole), 3,5-diaminobenzoic acid (15.22 g, 0.1 mole), 2,6-diaminopyridine (11.01 g, 0.1 mole), NMP (222 g) and toluene (45 g) were added, stirred (200 r.p.m.) at room temperature for 1 hour, then heated to 180° C., and stirred at that temperature for 1 hour. The toluene-water co-distillate (15 ml) was removed and, with the subsequently formed distillate being rejected from the system, the stirring was continued at 180° C. for 3 hours to complete the reaction, yielding 20% polyimide varnish, which had an acid equivalent of 36 (the molecular weight of the polymer per COOH was 1554).

Preparation of Electrodeposition Bath

An aqueous electrodeposition bath was prepared by stirring a mixture of the polyimide varnish (100 g), 3SN [a 1:3 (weight) mixture in solution of NMP and tetrahydrothiophen-1,1-dioxide],(100 g), benzyl alcohol (50 g), methylmorpholine (2.60 g sufficient to achieve 200 mol % neutralization) and water (1 g).

The thus prepared aqueous electrodeposition bath was a dark reddish brown clear solution having the following characteristics: block polyimide, 7.6%; pH, 7.2; electrical conductivity, 89 (KµS/cm); temperature, 29.8° C.

Experimental Electrodeposition

A constant-voltage dc generator of Takasago Seisakusho K. K. was used. The aqueous electrodeposition bath was put into a beaker and a copper plate was placed at the cathode and a workpiece (metal sheet) at the anode, and an electric current was applied to start electrodeposition, which was conducted under the following different conditions.

1) Methylmorpholine was further added (1.3 g) to the initial electrodeposition bath.

The resulting bath had the following characteristics: polyimide content, 6.4%; pH, 7.8; electrical conductivity, 95 (KµS/cm); temperature, 29.2° C.

The metal sheet as the workpiece was a rolled copper sheet (150×70×0.5 mm; cleaned with acetone). The bath temperature was 29.2° C.; inter-electrode distance, 60 mm; voltage, 100 V; current impression time, 90 seconds (initial current: 0.07 A; final current: 0.04 A); impressed electricity, 4.2 q (coulomb).

The treated copper sheet was washed with water, stoved by infrared heating at 120° C. for 30 minutes, then by electric heating at 200° C. for 30 minutes. The deposited polyimide film had a beautiful uniform appearance with a copper-colored gloss. The thickness of the polyimide film was 11±2.9 µm on the obverse surface and 9.0±1.1 µm on the reverse surface; the film had good enough adhesion to pass a bending test.

2) Water was further added (20 g) to the initial electrodeposition bath.

The resulting bath had the following characteristics: polyimide content, 6.4%; pH, 8.1; electrical conductivity, 142 (KµS/cm); temperature, 32.2° C. The bath was a dark red clear solution having the following characteristics: polyimide, 5.7%; NMP, 33.7%; sulfolane, 32.2%; benzyl alcohol, 14.3%; water, 11.6%; methylmorpholine, 2.5 g.

A copper sheet (150×70×0.5 mm; cleaned with acetone) was used as a metal workpiece for current impression under the following conditions: voltage, 100 V; impression time, 120 seconds (initial current, 0.15 A; final current, 0.08 A); impressed electricity, 12.4 q (coulomb).

After washing with water, the treated copper sheet was stored by infrared heating at 120° C. for 30 minutes and electric heating at 200° C. for 30 minutes to deposit a polyimide film having a copper-colored gloss. The thickness of the polyimide film was 13±4.5 µm on the obverse surface and 12±1.5 µm on the reverse surface. Both coats were tightly adherent and dense and could pass a bending test.

The copper sheet was replaced by a copper foil (150×70×0.005 mm; cleaned with acetone) and an electric current was impressed under the following conditions: voltage, 100 V; impression time, 120 seconds (initial current, 0.11 A; final current, 0.04 A); impressed electricity, 7.5 q (coulomb). After washing with water, the treated copper foil was stoved by infrared heating at 120° C. for 30 minutes and electric heating at 200° C. for 30 minutes to deposit a dense and tightly adherent polyimide coat having a dark brown gloss. The polyimide coat passed a bending test; it was 16±3.8 µm thick on the obverse surface and 20±5 µm on the reverse surface.

3) The substrate metal was SUS 32 (stainless steel: 150× 70×0.5 mm; cleaned with acetone).

To prepare an electrodeposition bath, a mixture of the 20% polyimide varnish (100 g), 3SN (150 g), benzyl alcohol (50 g), methylmorpholine (5.20 g for 400% neutralization) and water (27.5 g) was stirred, yielding a dark red clear solution. An electric was current impressed under the following conditions: voltage, 100 V; impression time, 60 seconds (initial current, 0.05 A; final current, 0.04 A); impressed electricity, 2.9 q (coulomb). The thus treated workpiece was washed with water and subjected to heat treatments first at 120° C. for 30 minutes, then at 200° C. for 30 minutes, to produce a light green, dense, uniform polyimide film having a golden gloss. The thickness of the polyimide film was 15±1.5 µm on the obverse surface and the polyimide film on the reverse surface was thinner in the center than in the other areas. Both films passed a bending test.

EXAMPLE 2

Preparation of Block Polyimide

A mixture of 3,4,3',4'-benzophenonetetracarboxylic dianhydride (32.22 g, 0.1 mole), bis-[4-(3-aminophenoxy) phenyl]sulfone (21.63 g, 0.05 moles), valerolactone (1.5 g, 0.015 moles), pyridine (2.4 g, 0.03 moles), NMP (200 g) and toluene (30 g) was stirred (200 r.p.m.) at room temperature for 30 minutes, heated to 180° C., stirred at that temperature for 1 hour. The toluene-water co-distillate (15 ml) was removed. Following air cooling, 3,4,3',4'-benzophenonetetracarboxylic dianhydride (6.11 g, 0.05 moles), 3,4-diaminobenzoic acid (15.216 g, 0.1 mole), NMP (119 g) and toluene (30 g) were added and the mixture was stirred at room temperature for 30 minutes. Following continued stirring at 180° C. for 1 hour, the water-toluene co-distillate (15 ml) was removed. With the subsequently formed distillate being rejected from the system, the stirring was continued at 180° C. for 2.5 hours to complete the reaction, yielding a polyimide having a concentration of 20% in NMP. The acid equivalent of the polyimide was 70 (the molecular weight of the polymer per COOH was 798).

Experimental Electrodeposition

An aqueous electrodeposition bath was prepared from the 20% varnish (100 g), 3SN (150 g), benzyl alcohol (75 g), methylmorpholine (5.0 g) and water (30 g); using this electrodeposition bath (polyimide content, 7.4%; pH, 7.8), experiments were conducted as in Example 1.

1) A copper sheet (150×70×0.5 mm; cleaned with acetone) was used as a workpiece.

An electric current was impressed under the following conditions: voltage, 100 V; impression time, 180 seconds (initial current, 0.22 A; final current, 0.09 A); impressed electricity, 22.7 q (coulomb). The treated sheet was immersed in a 1:1 (by volume) mixture of ethyl alcohol and hexane, then immersed in dioxane, followed by heating (120° C.×30 min→200° C.×30 min) to provide a copper-colored, uniform, smooth polyimide coat. The thickness of the polyimide coat was 17 μm on the obverse surface and 14 μm on the reverse surface; it passed a bending test.

2) Brass (150×70×0.5 mm; cleaned with acetone) was used as a workpiece for electrodeposition.

An electric current was impressed under the following conditions: 100 V; voltage, impression time, 93 seconds (initial current, 0.21 A; final current, 0.11 A); impressed electricity, 13.3 q (coulomb). The treated workpiece was immersed in a 1:1 (by volume) mixture of ethanol and hexane, then immersed in dioxane, followed by heating (120° C.×30 min→200° C.×30 min) to provide an electrodeposited polyimide coat having a golden gloss. The thickness of the polyimide coat was 11 μm on the obverse surface and 9 μm on the reverse surface.

EXAMPLE 3

Synthesis of Random Polyimide

A mixture of 3,4,3',4'-benzophenonetetracarboxylic dianhydride (48.33 g, 0.15 moles), 3,5-diaminobenzoic acid (7.608 g, 0.05 moles), 2,6-diaminopyridine (5.507 g, 0.05 moles), bis[4-(3-aminophenoxy)phenyl]sulfone (21.63 g, 0.05 moles), valerolactone (1.5 g, 0.015 moles), pyridine (2.4 g, 0.03 moles), NMP (311 g) and toluene (50 g) was stirred in a nitrogen stream for 1 hour. The stirred mixture was heated to 180° C. and further stirred at that temperature for 1 hour and the distilling water-toluene mixture (15 g) was removed. With the subsequently formed distillate being rejected from the system, heating was continued at 180° C. for 2 hours to complete the reaction, yielding 20% polyimide varnish, which had an acid equivalent of 36 (the molecular weight of the polymer per COOH was 1554).

Experimental Electrodeposition

The polyimide varnish (100 g), 3SN (150 g), benzyl alcohol (50 g), N-methylmorpholine (6.0 g) and water (30 g) were mixed and the mixture was stirred to provide a dark reddish brown clear solution as an aqueous electrodeposition bath, which had the following characteristics: polyimide content, 6.0%, pH, 8.2; electrical conductivity, 115 (KμS/cm); temperature, 27.7° C.

Electrodeposition was performed according to different schedules.

1) A copper sheet was subjected to electrodeposition as in Example 1.

An electric current was impressed under the following conditions: voltage, 120 V; impression time, 120 seconds (initial current, 0.13 A; final current, 0.06 A); impressed electricity, 9.9 q (coulomb). After washing with water, heating was conducted first at 120° C. for 30 minutes, then at 200° C. for 30 minutes, yielding a copper-colored uniform polyimide coat, which had a thickness of 11 μm on the observe surface and 8.1 μm on the reverse surface. It successfully passed a bending test.

2) A copper foil was subjected to electrodeposition as in Example 1.

An electric current was immersed under the following conditions: voltage, 120 V; impression time, 120 seconds (initial current, 0.13 A; final current, 0.06 A); impressed electricity, 11.0 q (coulomb). After washing with water, heating was conducted first at 120° C. for 30 minutes, then at 200° C. for 30 minutes, yielding a copper-colored, glossy, uniform dense polyimide coat, which had a thickness of 6.7 μm on the obverse surface. The polyimide coat on the reverse surface had a thickness of 5.4 μm and was thinner in the center than in the other areas.

What is claimed is:

1. A polyimide composition for electrodeposition comprising a neutral salt of a polyimide which is the product of reaction between an aromatic tetracarboxylic dianhydride and an aromatic diamine, a polar solvent that dissolves said polyimide, water and a poor solvent for said polyimide, said polyimide being prepared using an aromatic diaminocarboxylic acid as part of said aromatic diamine.

2. A polyimide composition for electrodeposition according to claim 1, wherein said aromatic tetracarboxylic dianhydride is selected from the group consisting of diphenyltetracarboxylic dianhydride, benzophenonetetracarboxylic dianhydride, pyromellitic dianhydride, and 2,2-bis-(3,4-dicarboxyphenyl)hexafluoropropane dianhydride;

said aromatic diamine is selected from the group consisting of phenylenediamine, diaminotoluene, diaminopyridine, diaminodiphenylmethane, diaminodiphenylether, diaminodiphenylsulfone, bis-aminophenoxy-benzene, bis-aminophenoxy-diphenylsulfone, bis-aminophenoxyphenylpropane, dimethylbenzidine, diaminonaphthalene, and 2,2-bis[4-(4-aminophenoxy)phenyl)hexafluoropropane; and said aromatic diaminocarboxylic acid is selected from the group consisting of 3,5-diaminobenzoic acid, 2,5-diaminoterephthalic acid, 2,4-diaminophenylacetic acid, and 3,5-diamino-2-naphthalenecarboxylic acid.

3. A polyimide composition for electrodeposition according to claim 1, wherein said polyimide is a block polyimide derived from an imide oligomer, said block polyimide prepared by a consecutive reaction comprising reacting an aromatic tetracarboxylic dianhydride and an aromatic diamine in the presence of a binary catalyst consisting of valerolactone and pyridine in a first stage to form the imide oligomer, and then supplying an additional amount of a different aromatic tetracarboxylic dianhydride and/or the aromatic diamine to the imide oligomer and reacting so to form the block polyimide in a second stage.

4. A polyimide composition for electrodeposition according to claim 1, wherein said aromatic diaminocarboxylic acid is 3,5-diaminobenzoic acid.

5. A polyimide composition for electrodeposition according to claim 1, wherein said poor solvent for said polyimide is benzyl alcohol or furfuryl alcohol.

6. A board comprising an electroconductive material and a electrodeposited coating containing the polyimide composition set forth in claim 1.

7. A board according to claim 6 wherein the electroconductive material includes a flexible copper sheet.

* * * * *